US012605711B2

(12) United States Patent
Park et al.

(10) Patent No.: US 12,605,711 B2
(45) Date of Patent: Apr. 21, 2026

(54) POUCH FOR IN-VITRO DIAGNOSTIC ITEMS

(71) Applicant: Jae Ku Park, Gwangmyeong-si (KR)

(72) Inventors: Jae Ku Park, Gwangmyeong-si (KR); Seung Hoon Kim, Hanam-si (KR)

(73) Assignee: Jae Ku Park, Gwangmyeong (KR)

( * ) Notice: Subject to any disclaimer, the term of this patent is extended or adjusted under 35 U.S.C. 154(b) by 759 days.

(21) Appl. No.: 18/076,204

(22) Filed: Dec. 6, 2022

(65) Prior Publication Data

US 2023/0249188 A1 Aug. 10, 2023

(30) Foreign Application Priority Data

Feb. 4, 2022 (KR) ........................ 10-2022-0014587

(51) Int. Cl.
*B01L 3/00* (2006.01)

(52) U.S. Cl.
CPC ......... *B01L 3/505* (2013.01); *B01L 2200/025* (2013.01); *B01L 2200/16* (2013.01); *B01L 2300/044* (2013.01); *B01L 2300/123* (2013.01)

(58) Field of Classification Search
CPC ............... B01L 3/505; B01L 2200/025; B01L 2200/01; B01L 2300/044; B01L 2300/123
See application file for complete search history.

(56) References Cited

U.S. PATENT DOCUMENTS 5,388,699 A * 2/1995 Ratajczak ................. B01L 9/06
206/569
2010/0166616 A1* 7/2010 Price ....................... B01L 9/543
422/400

FOREIGN PATENT DOCUMENTS

EP 3 582 896 B1 6/2021
KR 10-0735080 B1 7/2007

OTHER PUBLICATIONS

May 4, 2022 Office Action issued in Korean Patent Application No. 10-2022-0014587.

* cited by examiner

*Primary Examiner* — Charles Capozzi
*Assistant Examiner* — Alex Ramirez
(74) *Attorney, Agent, or Firm* — Oliff PLC

(57) ABSTRACT

A pouch for a diagnosis item includes (i) a pocket portion with a storage space configured to hold a buffer that has an elongate shape and is configured to hold a sample diluent, and (ii) a buffer supporter formation portion that is connected to one side of the pocket portion. The buffer supporter formation portion includes a buffer support hole that is sized to receive the buffer and support the buffer such that the buffer is oriented in an upright state to avoid spilling of the sample diluent. The buffer supporter formation portion includes a shelf supported by leg portions. The shelf includes the buffer support hole. The buffer supporter formation portion is configured to allow bending of the buffer supporter formation portion into a U shape, and to hold the U shape after being detached from the pocket portion.

16 Claims, 16 Drawing Sheets

POUCH FOR IN-VITRO DIAGNOSTIC ITEMS

FIELD OF THE INVENTION

The present invention relates to a pouch for in-vitro diagnostic items, and more particularly, to a pouch used to store items used for in-vitro diagnosis.

DESCRIPTION OF THE PRIOR ART

In-vivo diagnosis has been widely used in the past to examine the inside of a human body and identify disease states using endoscopy, computed tomography (CT), magnetic resonance tomography (MRI), and the like. In recent years, in-vitro diagnostic technology for separating test materials such as blood, saliva, and feces (hereinafter referred to as specimen) from the human body and then examining human diseases based on these samples is mainly used.

In-vitro diagnosis includes the steps of collecting a sample from the human body by using a collection tool such as a pipette or a cotton swab 201 (refer to FIG. 4); extracting the sample by immersing the collection tool in a sample diluent stored in a buffer 202 (refer to FIG. 4); and passing the sample diluent containing the extracted sample through a filter cap 203 (refer to FIG. 4) to drop it on a dripping site of a device 204 (refer to FIG. 4).

The device 204 is usually configured to determine whether there is a disease by applying a qualitative or quantitative technique to the sample falling on the dripping site, and then display the disease state.

The filter cap 203 has a filter installed therein, and is detachably coupled to the upper end of the buffer 202.

Hereinafter, for convenience of description, at least one of the collection tool 201, the buffer 202, the filter cap 203, and the device 204 used for in-vitro diagnosis is referred to as diagnosis item.

In the stage of performing the in-vitro diagnosis, a means for supporting the buffer 202 in an upright state is required so that the sample diluent is not spilled.

Hereinafter, for convenience of description, the means for supporting the buffer 202 in an upright state is referred to as buffer support means. Such buffer support means is not included in the diagnosis item.

A pouch has been devised and used to store the diagnosis item. Hereinafter, the pouch for storing the diagnosis item is referred to as pouch for in-vitro diagnostic items.

The diagnosis item stored in the pouch for in-vitro diagnostic items may be taken out and used before performing in-vitro diagnosis, and the used diagnosis item may be put back into the pouch for in-vitro diagnostic items and discarded.

Such a pouch stores the diagnosis item in the quantity required for one or multiple times in-vitro diagnoses.

FIG. 17 is a front view of a conventional pouch for in-vitro diagnostic items.

The conventional pouch for in-vitro diagnostic items has a pocket portion of the diagnosis item 110 with a storage space of the diagnosis item 110*a* formed therein, as shown in FIG. 17.

The pocket portion of the diagnosis item 110 has a rectangular back sheet of the diagnosis item pocket (refer to reference number 11 in FIG. 1) and a rectangular front sheet of the diagnosis item pocket coupled to the back sheet of the diagnosis item pocket (refer to reference number 12 in FIG. 1).

A pair of cut-out grooves 110*b* are formed to face each other in the back sheet of the diagnosis item pocket and the front sheet of the diagnosis item pocket.

The front sheet of the diagnosis item pocket is superimposed on the back sheet of the diagnosis item pocket.

A bending member for forming supporter 123 is formed in a shape of a plate body where a buffer support hole 123*a* is formed penetratingly in the center along a thickness direction.

On the outer surface of the bending member for forming supporter 123 are marked a left bending position line 123*b* indicating the left bending motion position and a right bending position line 123*c* indicating the right bending motion position.

A method of manufacturing the conventional pouch for in-vitro diagnostic items having the above-described configuration is described as follows.

First, a back sheet of the diagnosis item pocket and a front sheet of the diagnosis item pocket are prepared. PET, PE, aluminum, etc. may be used for the back sheet of the diagnosis item pocket and the front sheet of the diagnosis item pocket.

Next, the diagnosis item and the bending member for forming supporter 123 are placed on an area where the storage space of the diagnosis item 110*a* is will be formed among the upper surface of the back sheet of the diagnosis item pocket.

Next, the front sheet of the diagnosis item pocket is placed on top of the back sheet of the diagnosis item pocket.

Next, the edge area of the front sheet of the diagnosis item pocket and the back sheet of the diagnosis item pocket are coupled by using thermal bonding technique.

Here, since the thermal bonding technique is widely known, a detailed description thereof is omitted.

A method of performing in-vitro diagnosis by using the conventional pouch for in-vitro diagnostic items is described as follows.

First, by using scissors the pocket portion of the diagnosis item 110 is cut off along the direction in which the cut-out grooves 110*b* are connected.

Next, the diagnosis item and the bending member for forming supporter 123 stored in the storage space of the diagnosis item 110*a* are taken out.

Next, the bending member for forming supporter 123 is bent along the left bending position line 123*b* and the right bending position line 123*c* to form a buffer supporter (refer to reference number 30 in FIG. 5).

Next, in-vitro diagnosis is performed by using the diagnosis item.

During in-vitro diagnosis, the buffer 202 may be provided in an upright state on the buffer supporter.

The bending member for forming supporter 123 may be stored in a location other than the storage space of the diagnosis item 110*a*.

However, according to the conventional pouch for in-vitro diagnostic items, since the bending member for forming supporter 123 is stored in the storage space of the diagnosis item 110*a* together with the diagnosis item, the buffer supporter must be manufactured separately from the pouch. In addition, the buffer supporter must be accommodated in the pocket portion of the diagnosis item 110 when manufacturing the pouch, and the size of the storage space of the diagnosis item 110*a* is increased to accommodate the buffer supporter.

PRIOR ART

Patent Document: a Korean Patent Publication No. 10-0735080 (Publication date: Jul. 3, 2007)

SUMMARY OF THE INVENTION

Therefore, it is an object of the present invention to provide a pouch for in-vitro diagnostic items that does not need to manufacture a buffer supporter separately from the pouch, to accommodate the buffer supporter in the pocket portion of the diagnosis item when manufacturing the pouch, and to increase the size of the storage space of the diagnosis item in order to accommodate the buffer supporter.

To achieve this object, according to a first embodiment of the present invention, there is provided a pouch for in-vitro diagnostics items having a pocket portion of a diagnosis item with a storage space of the diagnosis item therein, comprising a buffer supporter formation portion, wherein the buffer supporter formation portion is formed by extending in a plate shape from one side of the pocket portion of the diagnosis item, a buffer support hole is formed penetratingly in a thickness direction in one area of the buffer supporter formation portion, and the buffer supporter is formed by bending motion in the buffer supporter formation portion separated from the pocket portion of the diagnosis item, wherein the buffer supporter includes a buffer-mounted shelf for mounting the buffer, a left leg portion for supporting shelf to support the left end of the buffer-mounted shelf against the bottom, and a right leg portion for supporting shelf to support the right end of the buffer-mounted shelf against the bottom.

Preferably, the buffer supporter formation portion is formed in plurality in order to support each buffer at the same time when multiple buffers are stored in the pocket portion of the diagnosis item.

Preferably, in order to form the buffer supporter formation portion by easily extending from the pocket portion of the diagnosis item, the pocket portion of the diagnosis item has a back sheet of the diagnosis item pocket and a front sheet of the diagnosis item pocket coupled to the back sheet of the diagnosis item pocket such that the storage space of the diagnosis item is formed between the front sheet of the diagnosis item pocket and the back sheet of the diagnosis item pocket; the buffer supporter formation portion includes a back sheet of the buffer supporter formed by extending from one side of the back sheet of the diagnosis item pocket, and a front sheet of the buffer supporter formed by extending from one side of the front sheet of the diagnosis item pocket and coupled to be superimposed on the back sheet of the buffer supporter; the buffer support hole is formed to penetrate the back sheet of the buffer supporter and the front sheet of the buffer supporter; and the buffer supporter is formed by a left bending motion and a right bending motion for the back sheet of the buffer supporter and the front sheet of the buffer supporter.

Preferably, in order to bend the bending member for forming supporter at the correct position, on either one of the outer surface of the back sheet of the buffer supporter and the outer surface of the front sheet of the buffer supporter, a left bending position line indicating a left bending motion position and a right bending position line indicating a right bending motion position are respectively marked.

Preferably, in order to support the buffer more stably, the buffer supporter formation portion further comprises a bending member for forming supporter provided between the inner surface of the back sheet of the buffer supporter and the inner surface of the front sheet of the buffer supporter, or on either one of the outer surface of the back sheet of the buffer supporter and the outer surface of the front sheet of the buffer supporter.

Preferably, in order to be able to bend the bending member for forming supporter at the correct position and easily bend it, in the bending member for forming supporter, concave-shaped bending auxiliary grooves are formed to assist the bending motion at the point where the left bending motion occurs and at the point where the right bending motion occurs.

Effects of the Invention

Therefore, according to the present invention, there is no need to manufacture the buffer supporter separately from the pouch, to accommodate the buffer supporter in the pocket portion of the diagnosis item when manufacturing the pouch, and to increase the size of the storage space of the diagnosis item in order to accommodate the buffer supporter.

DETAILED DESCRIPTION OF THE EXEMPLARY EMBODIMENTS

Hereinafter, the present invention will be described in detail with reference to the accompanying drawings.

Figure 1:
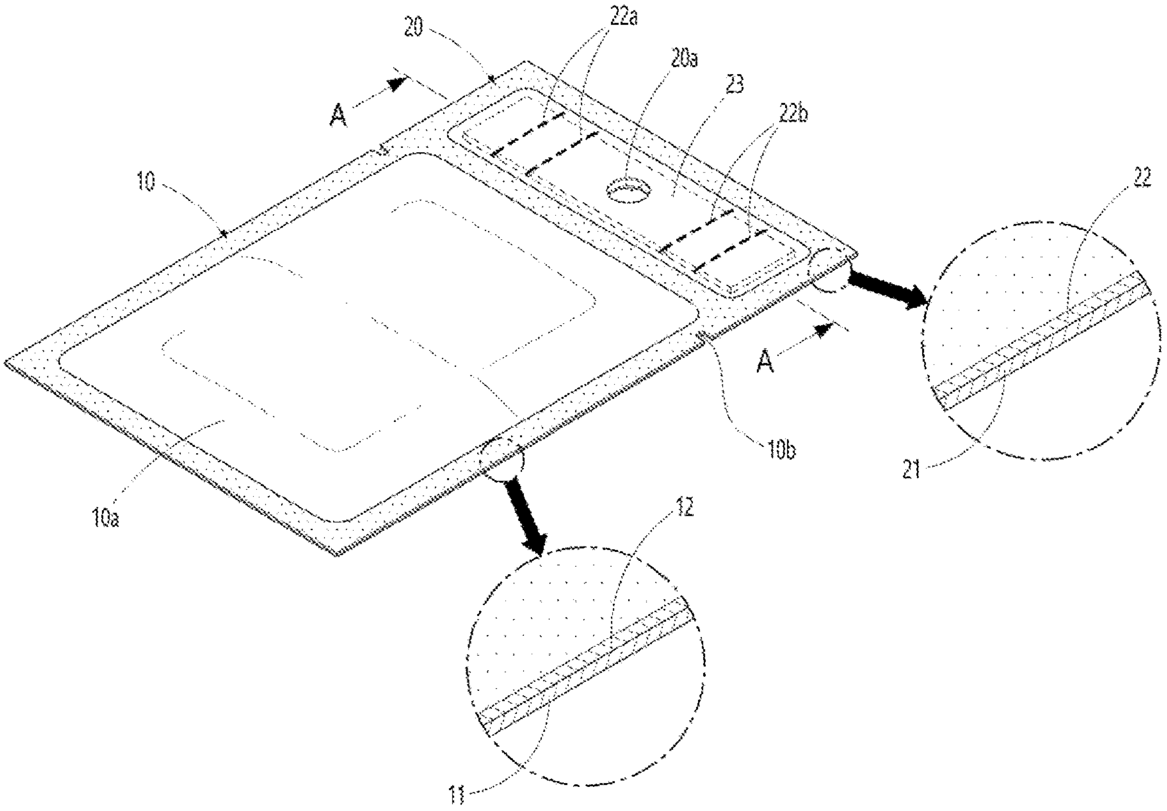
FIG. 1 is a perspective view of a pouch for in-vitro diagnostic items according to a first embodiment of the present invention.
Figure 2:
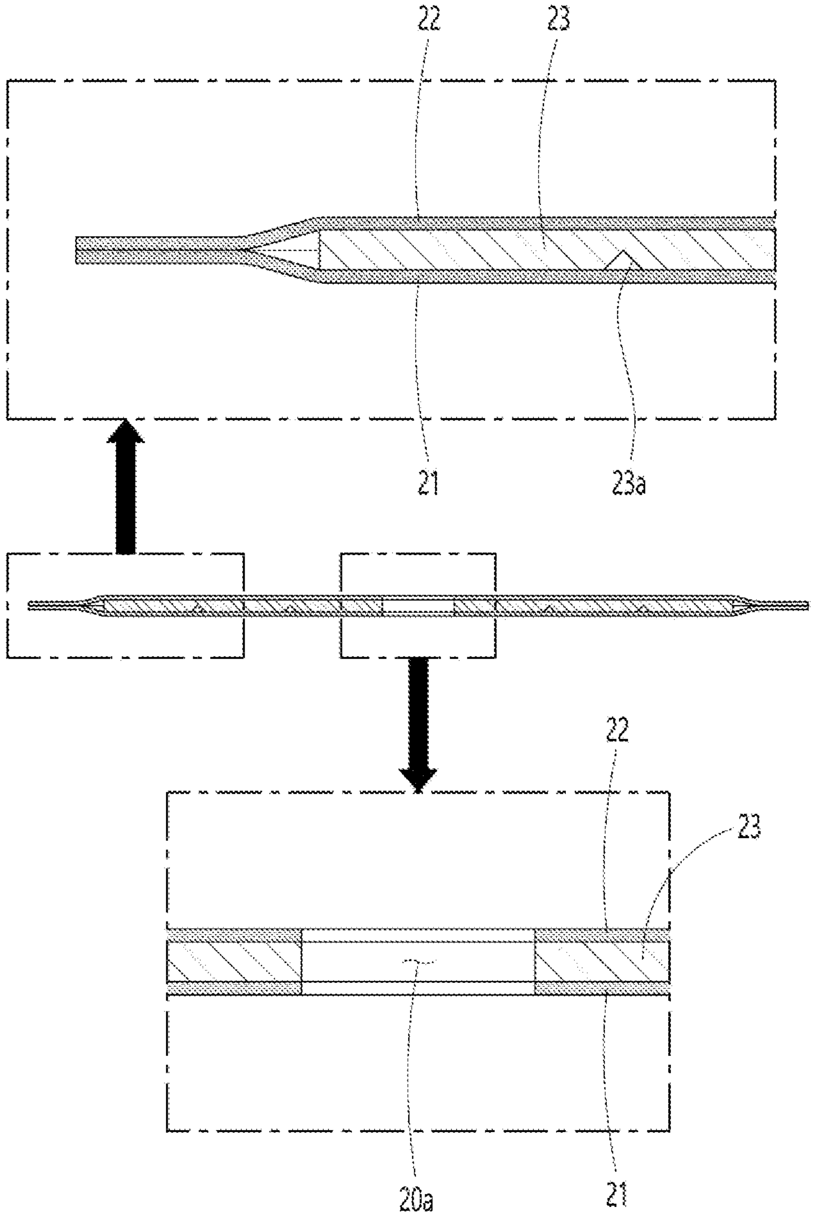
FIG. 2 is a cross-sectional view taken along line A-A of FIG. 1.
Figure 3:
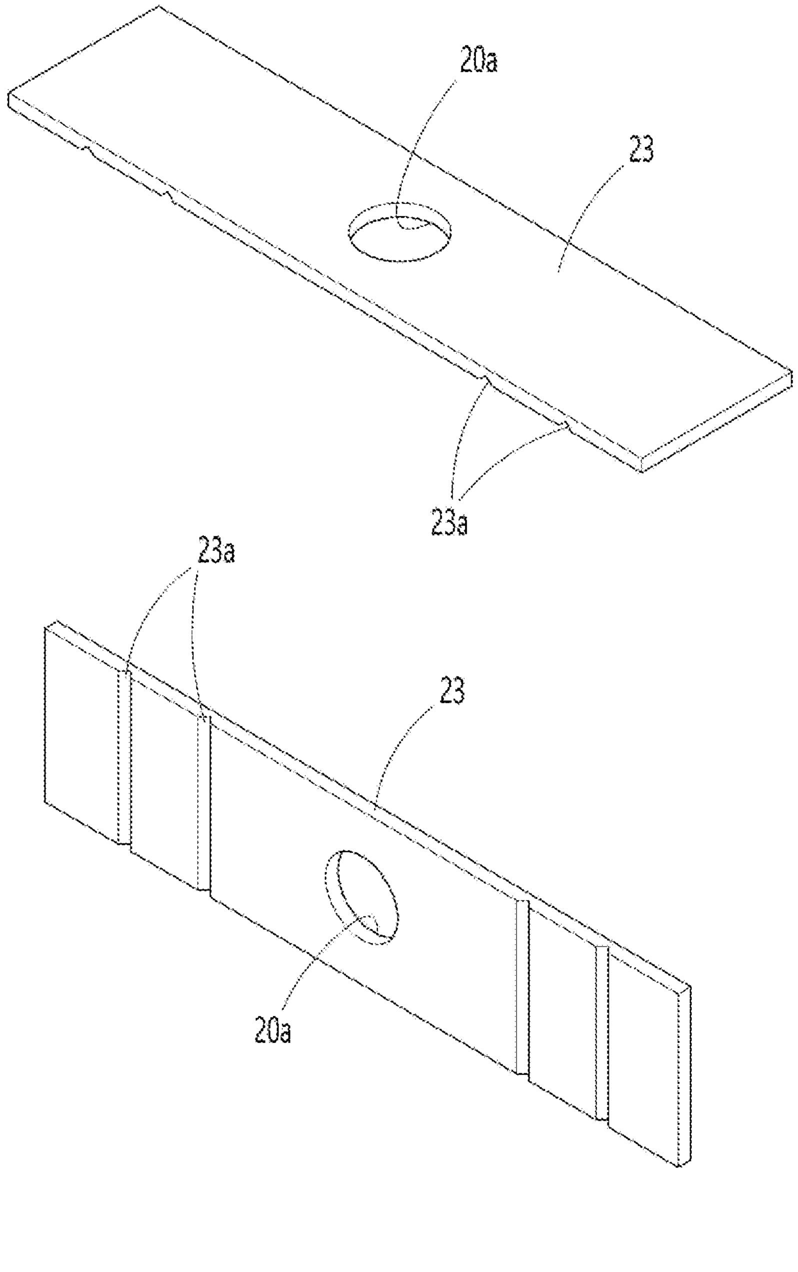
FIG. 3 is a perspective view of a bending member for forming supporter according to a first embodiment of the present invention.

FIG. 1 is a perspective view of a pouch for in-vitro diagnostic items according to a first embodiment of the present invention, FIG. 2 is a cross-sectional view taken along line A-A of FIG. 1, and FIG. 3 is a perspective view of a bending member for forming supporter according to a first embodiment of the present invention.

The pouch for in-vitro diagnostic items according to the first embodiment of the present invention includes, as shown in these drawings, a pocket portion of the diagnosis item 10 having a storage space of the diagnosis item 10*a* formed therein, and a buffer supporter formation portion 20 formed by extending in a plate shape from one side of the pocket portion of the diagnostic item 10.

The pocket portion of the diagnosis item 10 has a rectangular back sheet of the diagnosis item pocket 11 and a rectangular front sheet of the diagnosis item pocket 12 coupled to the back sheet of the diagnosis item pocket 11.

The front sheet of the diagnosis item pocket 12 is coupled to be superimposed on the back sheet of the diagnosis item pocket 11.

The storage space of the diagnosis item 10*a* is formed between the back sheet of the diagnosis item pocket 11 and the front sheet of the diagnosis item pocket 12.

A pair of cut-out grooves 10*b* are formed to face each other in the back sheet of the diagnosis item pocket 11 and the front sheet of the diagnosis item pocket 12.

The buffer supporter formation portion 20 has a rectangular back sheet of the buffer supporter 21 formed by extending from one side of the back sheet of the diagnosis item pocket 11, and a rectangular front sheet of the buffer supporter 22 formed by extending from the front sheet of the diagnosis item pocket 12, and a bending member for forming supporter 23 provided between the inner surface of the back sheet of the buffer supporter 21 and the inner surface of front sheet of the buffer supporter 22.

The front sheet of the buffer supporter 22 is coupled to be superimposed on the back sheet of the buffer supporter 21.

On the outer surface of the front sheet of the buffer supporter 22 are marked a left bending position line 22*a* indicating a left bending motion position and a right bending position line 22*b* indicating a right bending motion position.

The bending member for forming supporter 23 is formed in a shape of a rectangular plate body.

In the bending member for forming supporter 23, concave-shaped bending auxiliary grooves 23*a* are formed each at the point where a left bending motion occurs and at the point where a right bending motion occurs.

The bending auxiliary grooves 23*a* serve to assist in the bending of the bending member for forming supporter 23.

A buffer support hole 20*a* is formed so as to penetrate the back sheet of the buffer supporter 21, the front sheet of the buffer supporter 22 and the bending member for forming supporter 23 in a thickness direction.

A method of manufacturing the pouch for in-vitro diagnostic items according to the first embodiment of the present invention having the above-described configuration is described as follows. For convenience of explanation, it is assumed that the bending member for forming supporter 23 has been manufactured. The bending member for forming supporter 23 may be manufactured by using synthetic resin, paper, wire, metal sheet, or the like.

First, it is necessary to prepare a pouch back sheet in which the back sheet of the buffer supporter 21 is connected to the back sheet of the diagnosis item pocket 11 and a pouch front sheet in which the front sheet of the buffer supporter 22 is connected to the front sheet of the diagnosis item pocket 12. A left bending position line 22*a* and a right bending position line 22*b* are marked at the front sheet of the buffer supporter 22. The back sheet of the buffer supporter 21, the front sheet of the buffer supporter 22, the back sheet of the diagnosis item pocket 11, and the front sheet of the diagnosis item pocket 12 may be manufactured by using PET, PE, aluminum, or the like. For example, the back sheet of the buffer supporter 21, the front sheet of the buffer supporter 22, the back sheet of the diagnosis item pocket 11 and the front sheet of the diagnosis item pocket 12 may be manufactured in a triple layer structure comprised of an aluminum film, a PET film coupled to the outer surface of the aluminum film and a PE coating layer formed on the inner surface of the aluminum film.

Next, the diagnosis item is placed on an area where the storage space of the diagnosis item 10*a* will be formed among the upper surface of the back sheet of the diagnosis item pocket 11.

Next, the bending member for forming supporter 23 is placed on the upper surface of back sheet of the buffer supporter 21.

Next, the edge area of the pouch back sheet and the pouch front sheet and the area between the bending member for forming supporter 23 and the diagnosis item are coupled together by using thermal bonding technique.

Figure 4:
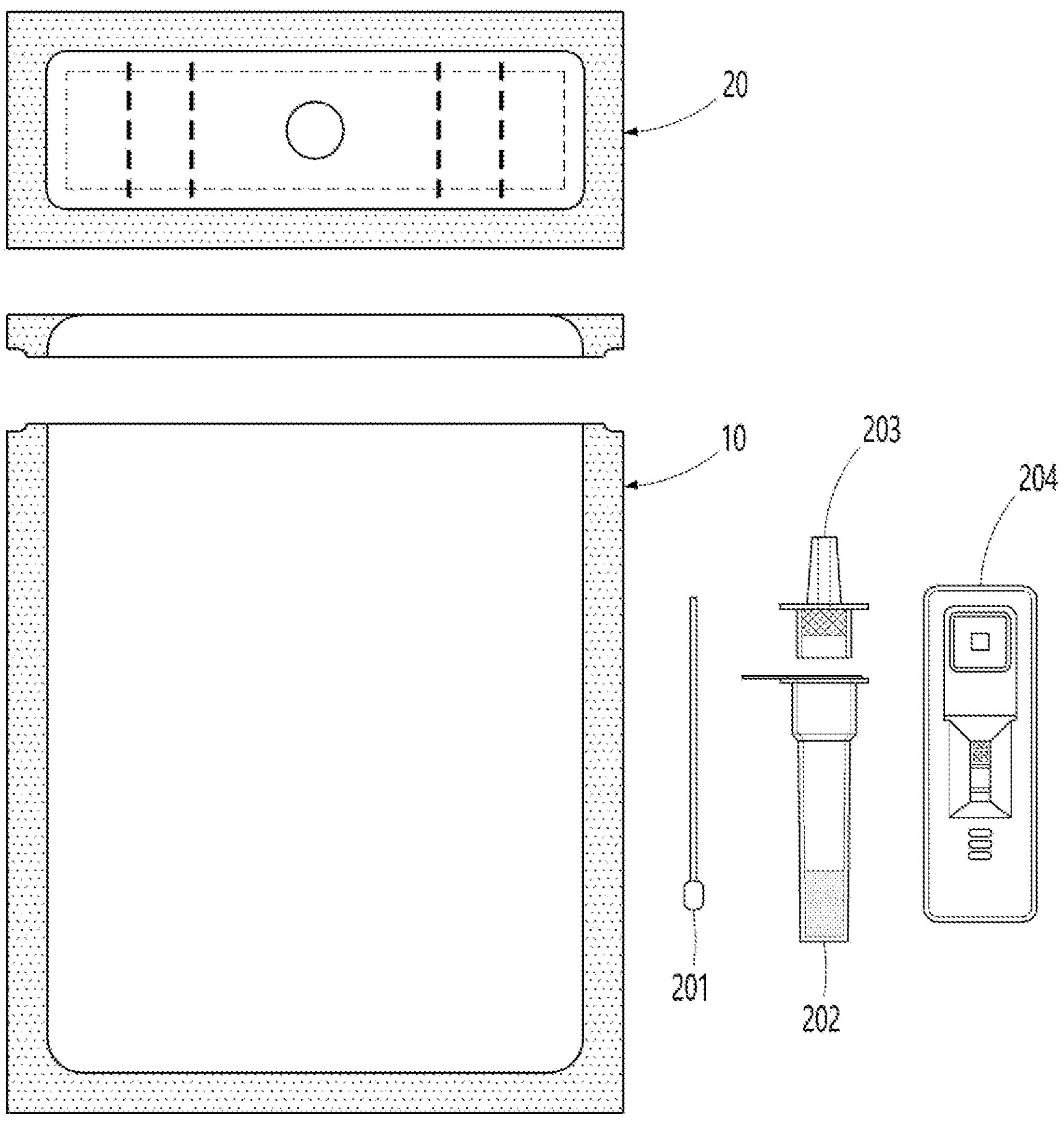
FIGS. 4, 5 and 6 are views each showing a method for performing in-vitro diagnosis by using a pouch for in-vitro diagnostic items according to the first embodiment of the present invention.
Figure 5:
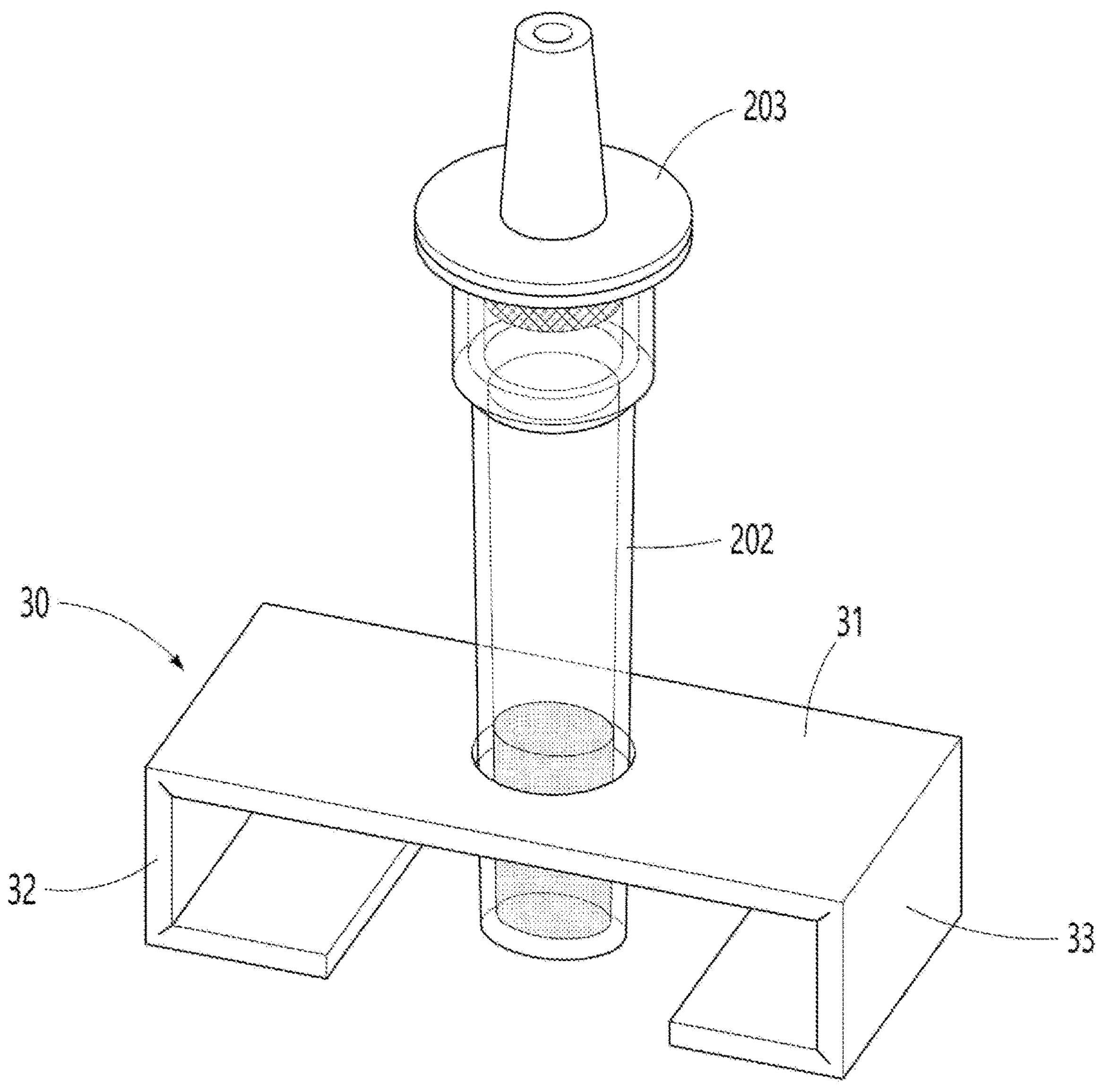
Figure 6:
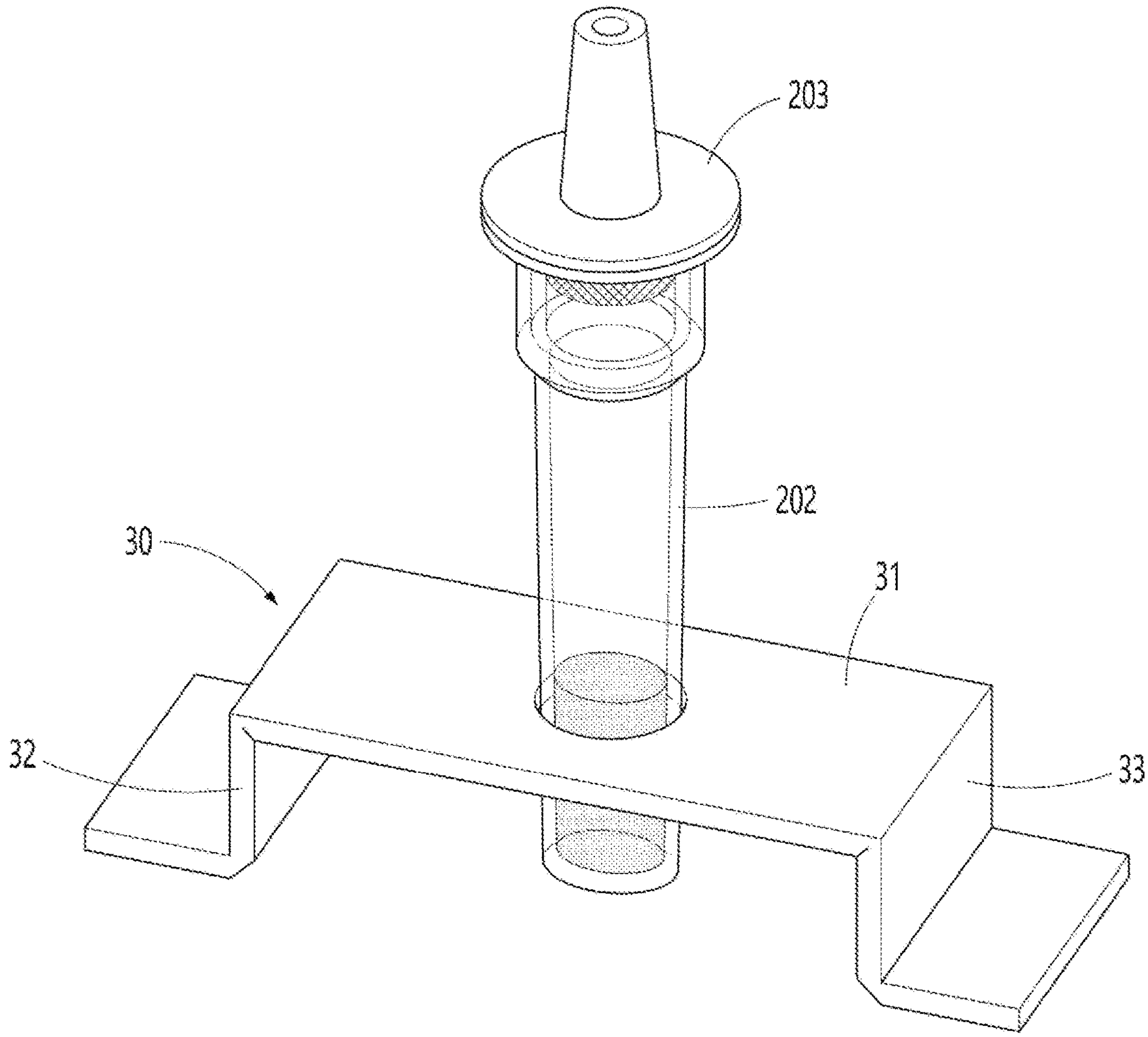

A method of performing in-vitro diagnosis by using the pouch for in-vitro diagnostic items according to the first embodiment of the present invention is described with reference to FIGS. 4, 5 and 6 as follows.

First, by using scissors or the like, the pocket portion of the diagnosis item 10 is cut off along a direction in which the cut-out groove 10*b* is connected. After cutting off the pocket portion of the diagnosis item 10, it is also desirable to cut off a pocket portion remaining in the buffer supporter formation portion 20.

Next, the diagnosis item stored in the storage space of the diagnosis item 10*a* is taken out.

Next, the buffer supporter 30 is formed by bending the front sheet of the buffer supporter 22, the back sheet of the buffer supporter 21, and the bending member for forming supporter 23 along the left bending position line 22*a* and the right bending position line 22*b*. The buffer supporter 30 may be formed in a shape shown in FIG. 5 or FIG. 6.

The buffer supporter 30 includes a buffer-mounted shelf 31 for mounting the buffer 202, a left leg portion for supporting shelf 32 to support the left end of the buffer-mounted shelf 31 against the bottom surface, and a right leg portion for supporting shelf 33 to support the right end of the buffer-mounted shelf 31 against the bottom surface.

Next, in-vitro diagnosis is performed by using the diagnosis item.

During in-vitro diagnosis, the buffer 202 may be provided in an upright state on the buffer supporter 30.

When a plurality of buffers 202 are stored in the pocket portion of the diagnosis item 10, each buffer 202 may be sequentially provided in an upright state on the buffer supporter 30.

Figure 7:
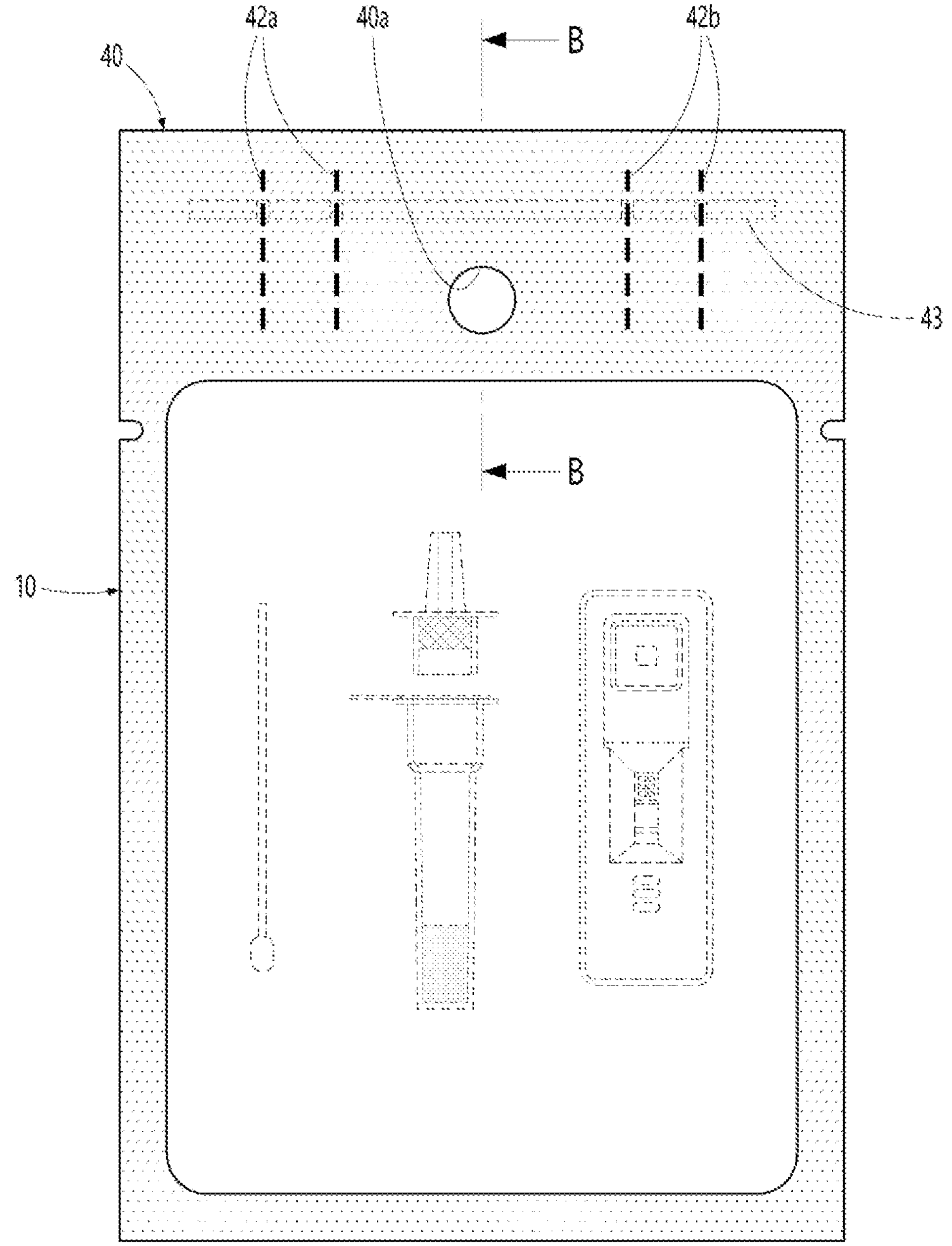
FIG. 7 is a front view of a pouch for in-vitro diagnostic items according to a second embodiment of the present invention.

On the other hand, in the above embodiment, the bending member for forming supporter 23 is formed in a plate shape, but the present invention may be implemented by forming a bending member for forming supporter 43 in a straight shape as shown in FIG. 7.

Figure 8:
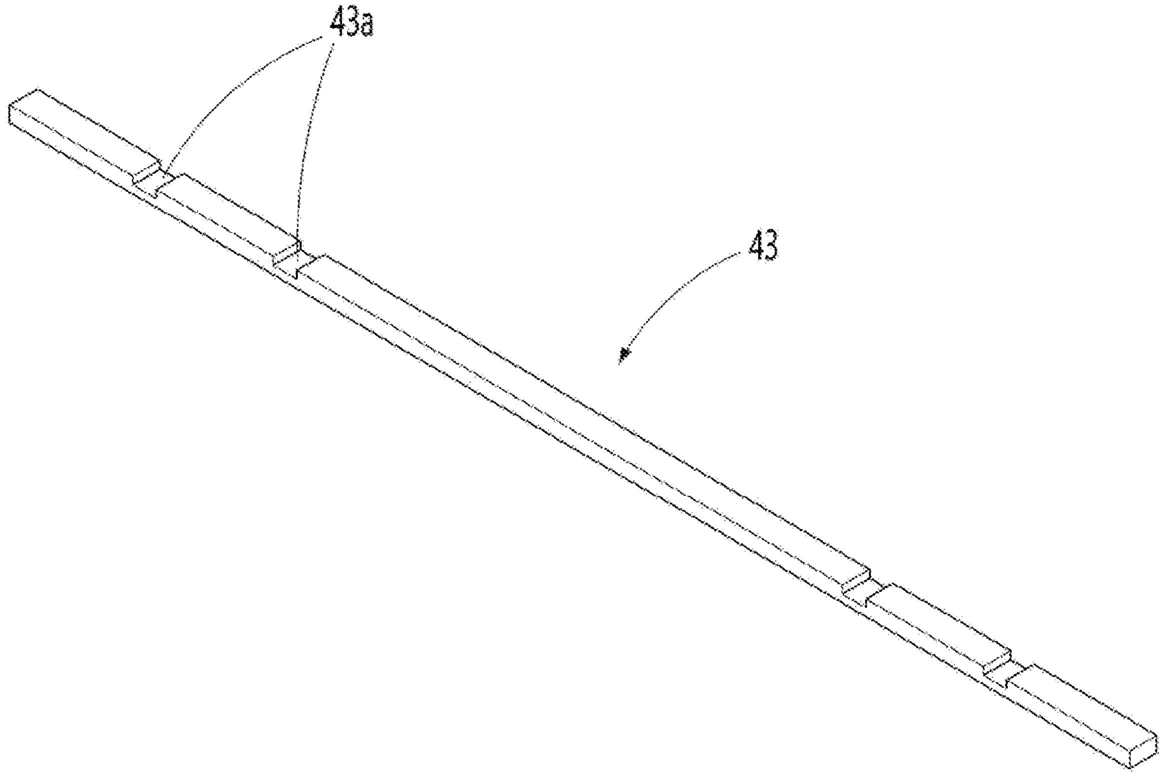
FIG. 8 is a perspective view of a bending member for forming supporter according to a second embodiment of the present invention.
Figure 9:
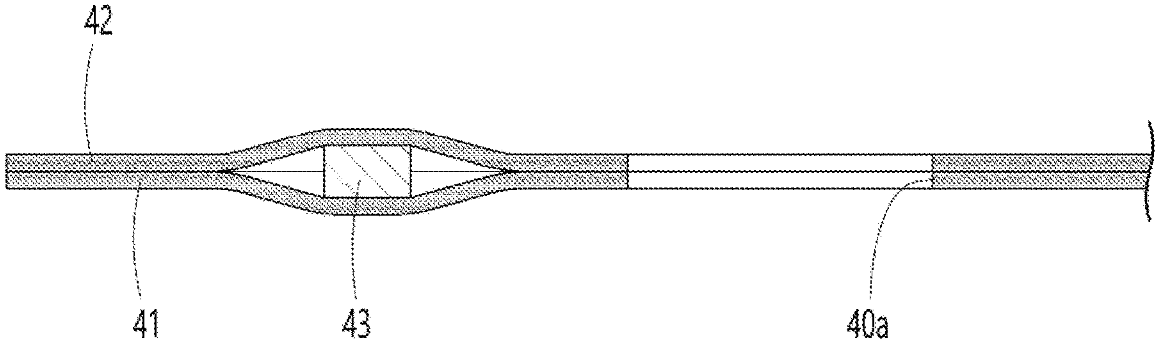
FIG. 9 is a cross-sectional view taken along line B-B of FIG. 7.

FIG. 7 is a front view of a pouch for in-vitro diagnostic items according to a second embodiment of the present invention, FIG. 8 is a perspective view of a bending member for forming supporter according to a second embodiment of the present invention, and FIG. 9 is a cross-sectional view taken along line B-B of FIG. 7.

In the case of the pouch for in-vitro diagnostic items according to the second embodiment of the present invention, the bending member for forming supporter 43 is provided between the inner surface of the back sheet of the buffer supporter 41 and the inner surface of the front sheet of the buffer supporter 42, the buffer support hole 40*a* is formed in the back sheet of the buffer supporter 41 and the front sheet of the buffer supporter 42.

In the bending member for forming supporter 43, bending auxiliary grooves 43*a* are formed.

And in the above embodiments, the bending member for forming supporter is provided between the inner surface of the back sheet of the buffer supporter and the inner surface of the front sheet of the buffer supporter, but the bending member for forming supporter may be provided on the outer surface of the back sheet of the buffer supporter or the outer surface of front sheet of the buffer supporter.

Figure 10:
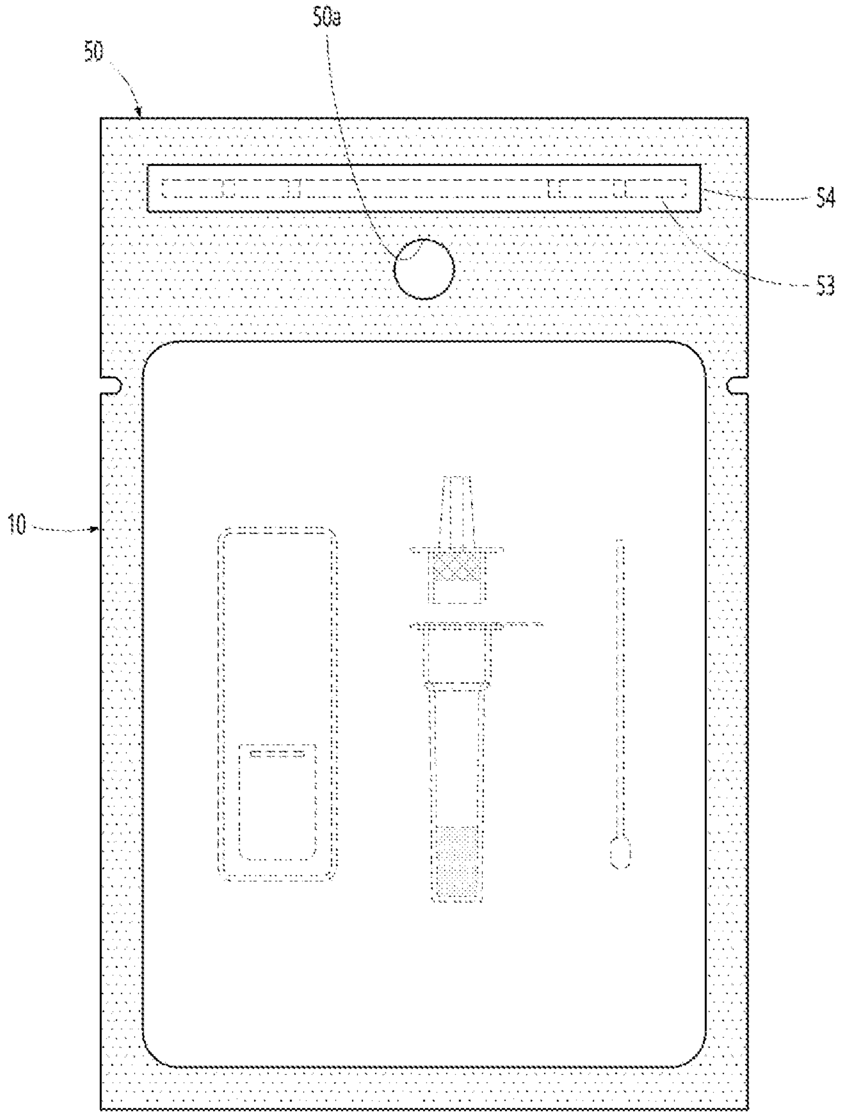
FIG. 10 is a rear view of a pouch for in-vitro diagnostic items according to a third embodiment of the present invention.

FIG. 10 is a rear view of a pouch for in-vitro diagnostic items according to a third embodiment of the present invention.

In the case of the pouch for the in-vitro diagnostic items according to the third embodiment of the present invention, a bending member for forming supporter 53 is provided on the outer surface of a back sheet of the buffer supporter. The bending member for forming supporter 53 may be fixed on the outer surface of the back sheet of the buffer supporter by using a fixing pad 54.

Meanwhile, in the above embodiments, the bending member for forming supporter is formed in a shape of a plate body or straight line, but the bending member for forming supporter may be formed in another shape.

Figure 11:
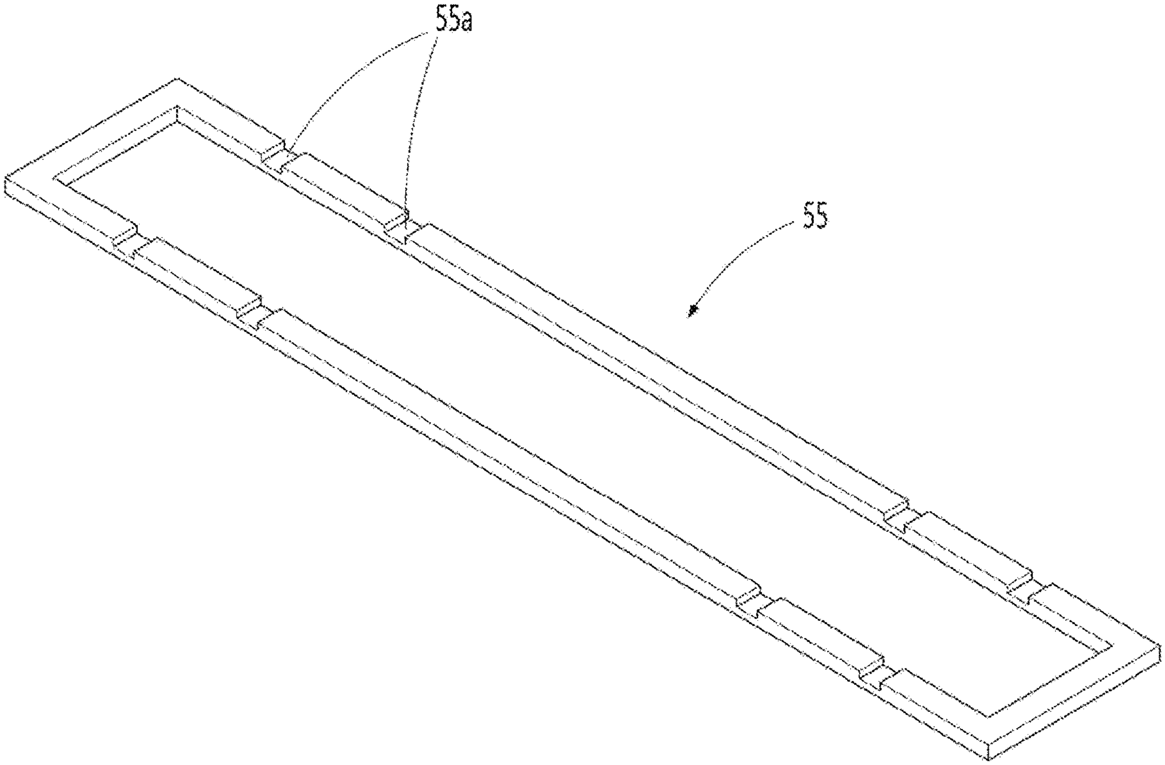
FIG. 11 is a perspective view of a bending member for forming supporter according to a fourth embodiment of the present invention.

FIG. 11 is a perspective view of a bending member for forming supporter according to a fourth embodiment of the present invention.

A bending member for forming supporter 55 according to the fourth embodiment of the present invention is formed in a rectangular shape and bending auxiliary grooves 55*a* are formed in it.

Figure 12:
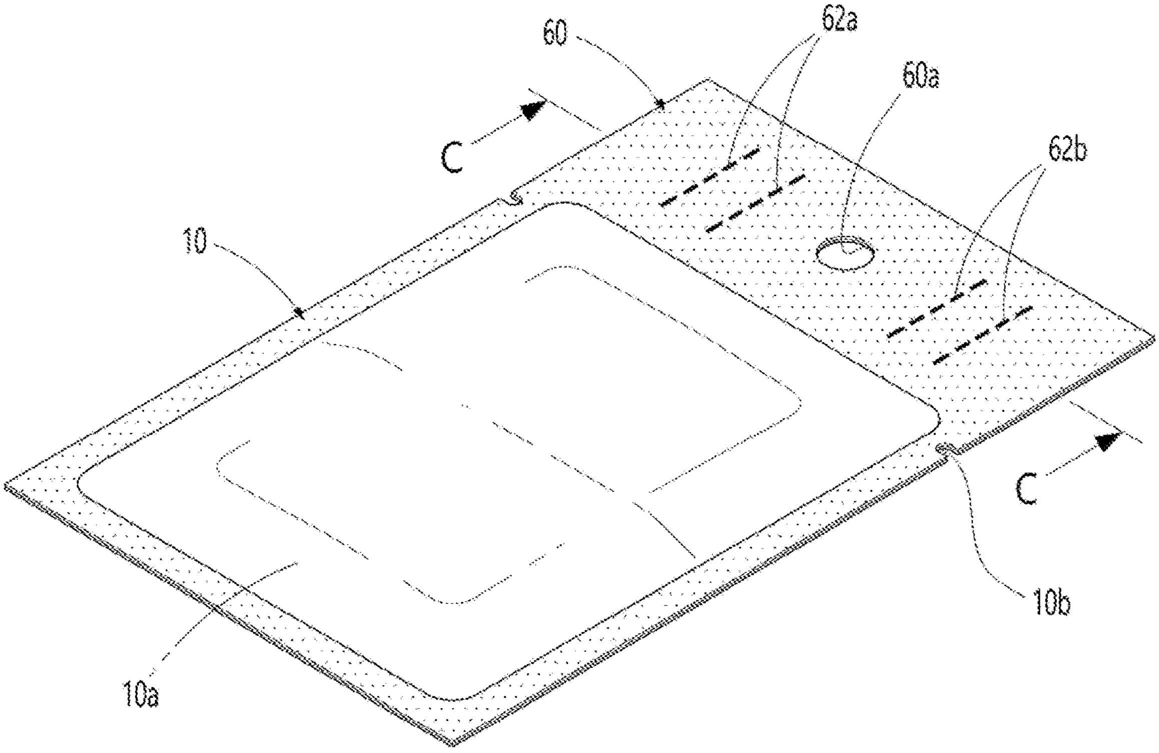
FIG. 12 is a perspective view of a pouch for in-vitro diagnostic items according to a fifth embodiment of the present invention.

In addition, in the above-described embodiments, the buffer supporter formation portion is configured to include the bending member for forming supporter, but, as shown in FIG. 12, the present invention may be implemented by forming the buffer supporter formation portion in a structure not having the bending member for forming supporter.

Figure 13:
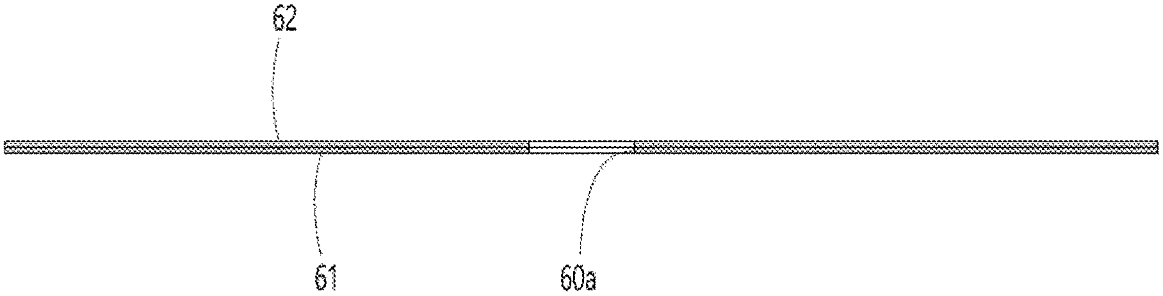
FIG. 13 is a cross-sectional view taken along line C-C of FIG. 12.

FIG. 12 is a perspective view of a pouch for in-vitro diagnostic items according to a fifth embodiment of the present invention, and FIG. 13 is a cross-sectional view taken along line C-C of FIG. 12.

A buffer support formation portion 60 of the pouch for in-vitro diagnostic items according to the fifth embodiment of the present invention has a rectangular back sheet of the buffer supporter 61 formed by extending from one side of the back sheet of the diagnosis item pocket (refer to reference number 11 in FIG. 1), and a rectangular front sheet of the buffer supporter 62 formed by extending from one side of the front sheet of the diagnosis item pocket (refer to reference number 12 in FIG. 1).

A buffer support hole 60*a* is formed so as to penetrate the back sheet of the buffer supporter 61 and the front sheet of the buffer supporter 62 in a thickness direction.

Also, in the above-described embodiments, the buffer supporter formation portion is formed by extending from the horizontal side of the pocket portion of the diagnosis item 10, but the present invention may be implemented by extending the buffer supporter formation portion from another side of the pocket portion of the diagnosis item 10.

Figure 14:
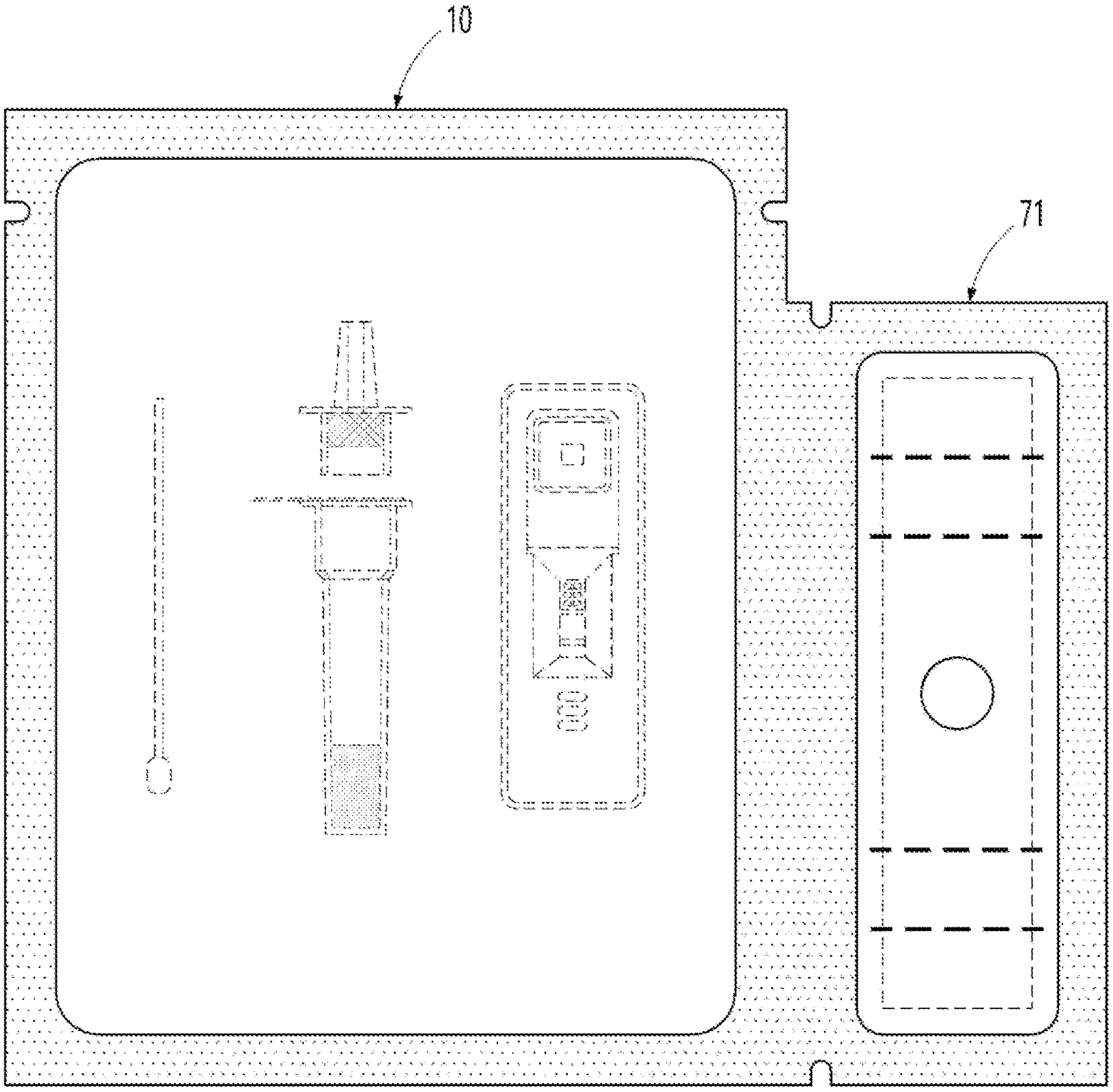
FIG. 14 is a front view of a pouch for in-vitro diagnostic items according to a sixth embodiment of the present invention.

FIG. 14 is a front view of a pouch for in-vitro diagnostic items according to a sixth embodiment of the present invention.

In the case of the pouch for in-vitro diagnostic items according to the sixth embodiment of the present invention, a buffer supporter formation portion 71 is formed by extending from a longitudinal side of the pocket portion of the diagnosis item 10.

In addition, the present invention may be implemented by forming the buffer supporter formation portion so that the bending direction of the buffer supporter formation portion in a state connected to the pocket portion of the diagnosis item 10 is different from that described in the above embodiments.

Figure 15:
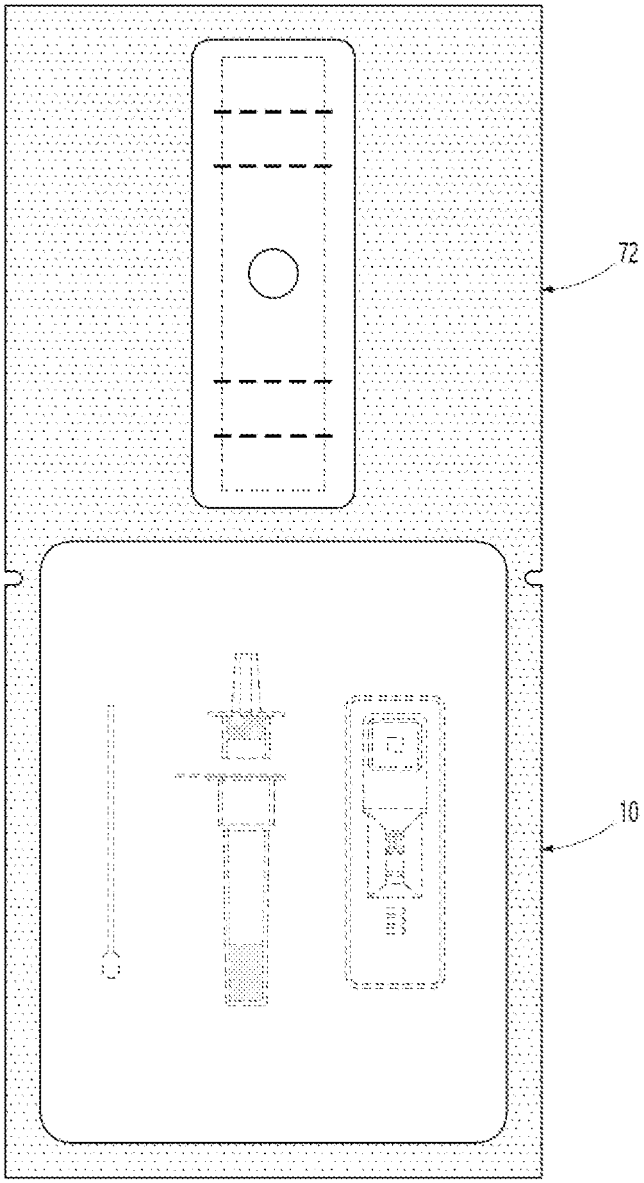
FIG. 15 is a front view of a pouch for in-vitro diagnostic items according to a seventh embodiment of the present invention.

FIG. 15 is a front view of a pouch for in-vitro diagnostic items according to a seventh embodiment of the present invention.

The bending direction of a buffer supporter formation portion 72 according to the seventh embodiment of the present invention is perpendicular to that of the buffer supporter formation portion 20 according to the first embodiment of the present invention.

In addition, although the above-described embodiments are configured to have one buffer supporter formation portion, it is possible to implement the present invention by configuring it to have a plurality of buffer supporter formation portions.

Figure 16:
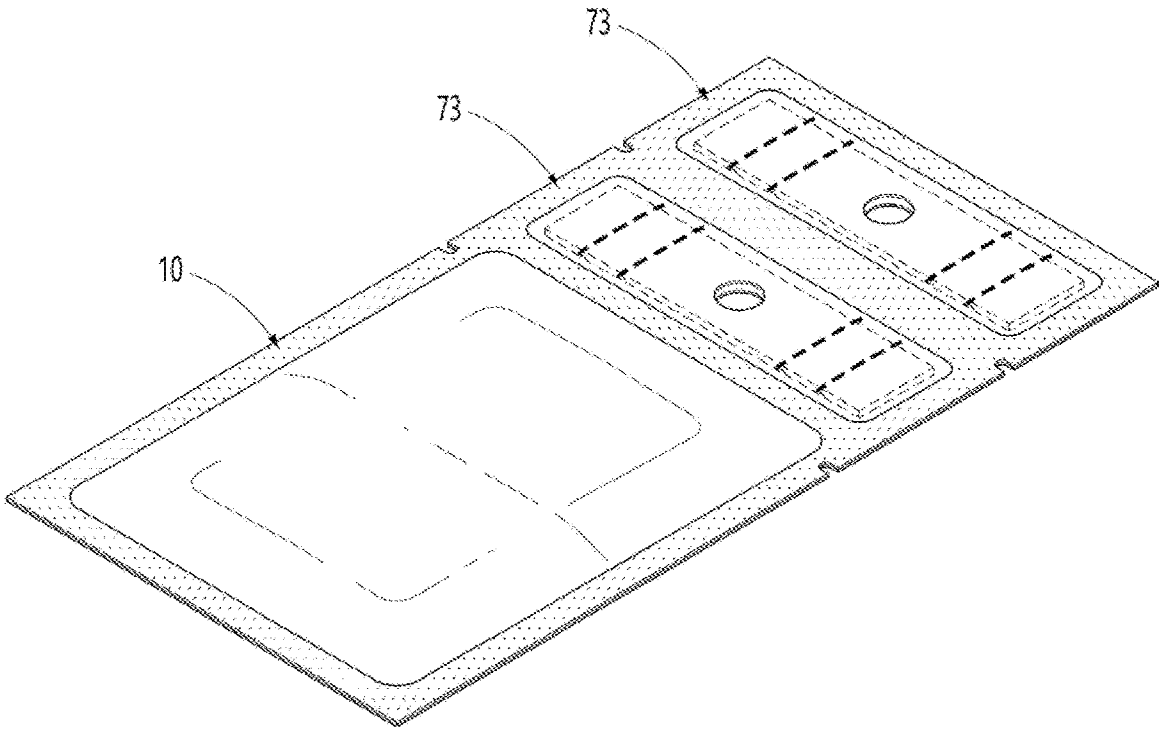
FIG. 16 is a perspective view of a pouch for in-vitro diagnostic items according to an eighth embodiment of the present invention.
Figure 17:
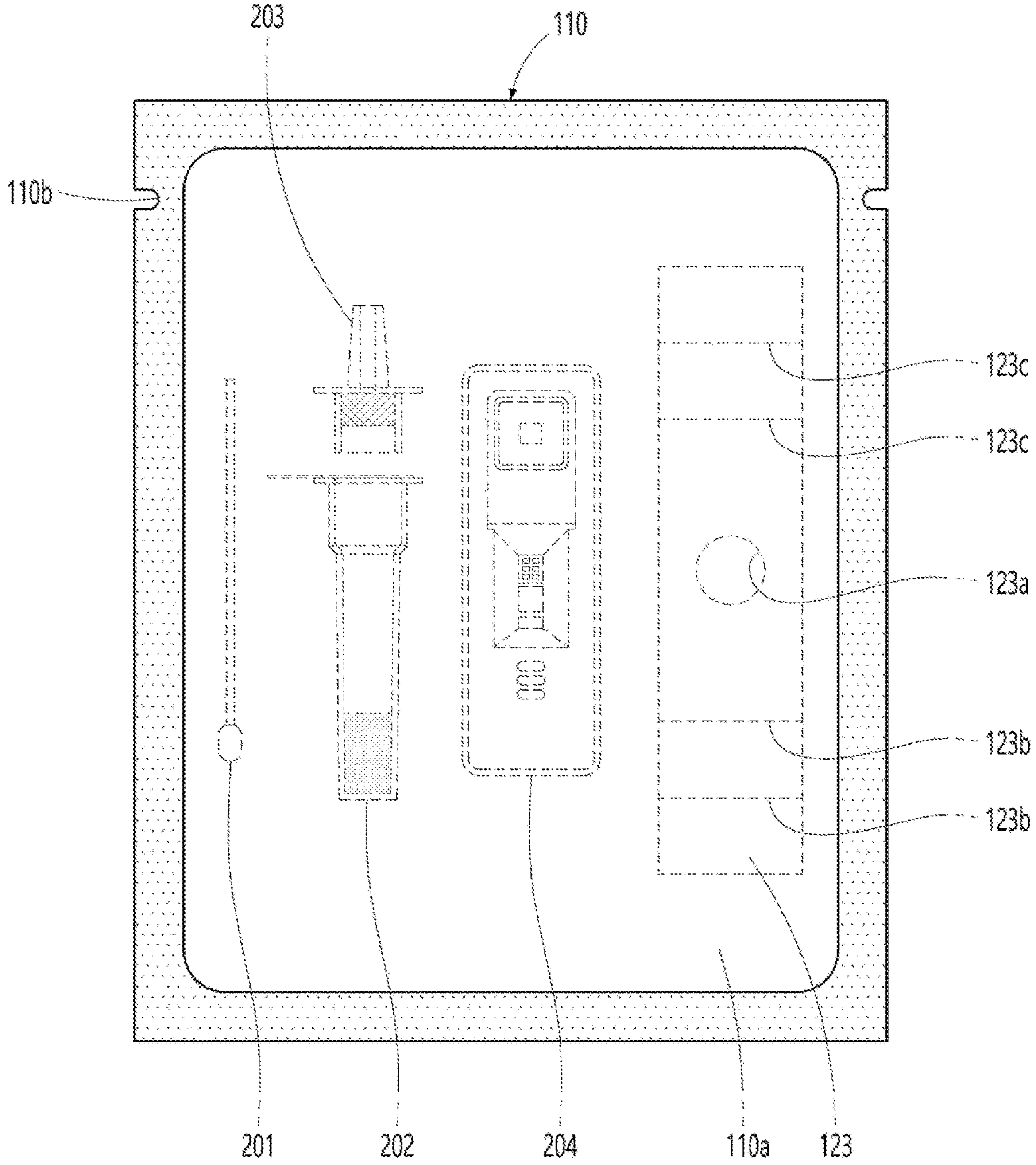
FIG. 17 is a front view of a conventional pouch for in-vitro diagnostic items.

FIG. 16 is a perspective view of a pouch for in-vitro diagnostic items according to an eighth embodiment of the present invention.

The pouch for in-vitro diagnostic items according to the eighth embodiment of the present invention has two buffer supporter formation portions 73.

Even in the case of the pouch for in-vitro diagnostic items according to the eighth embodiment of the present invention, on either one of the outer surface of the back sheet of the buffer supporter and the outer surface of the front sheet of the buffer supporter, a left bending position line and a right bending position line may be marked at each buffer supporter formation portion 73.

As described above, according to the embodiments of the present invention, the buffer supporter formation portion is formed by extending in a plate shape from one side of the pocket portion of the diagnosis item 10, a buffer support hole is formed penetratingly in a thickness direction in one area of the buffer supporter formation portion, and the buffer supporter 30 is formed by bending motion in the buffer supporter formation portion separated from the pocket portion of the diagnosis item 10, wherein the buffer supporter 30 includes the buffer-mounted shelf 31 for mounting the buffer 202, the left leg portion 32 for supporting shelf to support the left end of the buffer-mounted shelf 31 against the bottom, and the right leg portion for supporting shelf 33 to support the right end of the buffer-mounted shelf 31 against the bottom. Therefore, there is no need to manufacture the buffer supporter separately from the pouch, to accommodate the buffer supporter means in the pocket portion of the diagnosis item 10 when manufacturing the pouch, and to increase the storage space of the diagnosis item 10*a* in order to accommodate the buffer supporter means.

In addition, by forming a plurality of buffer supporter formation portions, each buffer 202 may be individually supported at the same time when a plurality of buffers 202 are stored in the pocket portion of the diagnosis item 10.

In addition, the buffer supporter formation portion is configured to include the back sheet of the buffer supporter formed by extending from one side of the back sheet of the diagnosis item pocket and the front sheet of the buffer supporter formed extending from one side of the front sheet of the diagnosis item pocket 12. Therefore, the buffer formation portion may be easily formed by extending from the pocket portion of the diagnosis item 10.

In addition, by marking a left bending position line indicating the left bending motion position and a right bending position line indicating the right bending motion position on either one of the outer surface of the back sheet of the buffer supporter and the outer surface of the front sheet of the buffer supporter, the bending member for forming supporter may be bent at the correct position.

In addition, by configuring the buffer supporter formation portion to further include the bending member for forming supporter provided between the inner surface of the back sheet of the buffer supporter and the inner surface of front sheet of the buffer supporter, or on either one of the outer surface of back sheet of the buffer supporter and the outer surface of the front sheet of the buffer supporter, the buffer 202 may be stably supported.

In addition, by forming concave-shaped bending auxiliary grooves in the bending member for forming supporter to assist the bending motion at the point where the left bending motion and the right bending motion occur, the bending member for forming supporter may be bent at the correct position and may be easily bent.

While the present invention has been particularly shown and described with reference to particular embodiments thereof, it is to be understood that this invention is not limited to the disclosed embodiments, but, on the contrary, various changes may be made by those skilled in the art without departing from the spirit and scope of the invention.

The invention claimed is:

1. A pouch for a diagnosis item, the pouch comprising a pocket portion and a buffer supporter formation portion, wherein:
- the pocket portion includes a storage space configured to hold the diagnosis item, the diagnosis item being one or more buffers, each of the one or more buffers having an elongate shape and being configured to hold a sample diluent; and
- the buffer supporter formation portion comprises at least one sheet that is connected to one side of the pocket portion,
- the at least one sheet extends from the one side of the pocket portion,
- the buffer supporter formation portion includes a buffer support hole that is sized to receive one buffer among the one or more buffers and support the one buffer such that the one buffer is oriented in an upright state to avoid spilling of the sample diluent,
- the buffer supporter formation portion includes a bending member, of a material different from a material of the at least one sheet, that is configured to allow bending of the buffer supporter formation portion into a U shape that includes (i) a shelf that includes the buffer support hole, (ii) a left leg portion extending from one end of the shelf, and (iii) a right leg portion extending from another end of the shelf, and
- the bending member is configured to hold the buffer supporter formation portion in the U shape after the buffer supporter formation portion is detached from the pocket portion and bent into the U shape, such that the buffer support hole included in the shelf is spaced from a horizontal surface when the left leg portion and the right leg portion are placed on the horizontal surface, enabling support of the one buffer in the upright state.

2. The pouch according to claim 1, wherein the buffer supporter formation portion is formed in plurality.

3. The pouch according to claim 1, wherein:
- the pocket portion comprises (i) a first back sheet and (ii) a first front sheet coupled to the first back sheet such that the storage space is formed between the first front sheet and the first back sheet;
- the at least one sheet of the buffer supporter formation portion comprises (i) a second back sheet that extends from one side of the first back sheet, and (ii) a second front sheet that extends from one side of the first front sheet and coupled to and superimposed on the second back sheet; and
- the buffer support hole penetrates the second back sheet and the second front sheet.

4. The pouch according to claim 3, wherein
- on either one the second back sheet and the second front sheet, a left bending position line is marked between the shelf and the left leg portion, and a right bending position line is marked between the shelf and the right leg portion.

5. The pouch according to claim 3, wherein
- the bending member is between the second back sheet and the second front sheet;
- the buffer support hole penetrates the second back sheet, the second front sheet and the bending member; and
- the bending member overlaps the shelf, the left leg portion and the right leg portion.

6. The pouch according to claim 3, wherein
- the bending member is between the second back sheet and the second front sheet; and
- the bending member overlaps the shelf, the left leg portion and the right leg portion.

7. The pouch according to claim 5, wherein in the bending member, bending auxiliary grooves are formed to assist the bending into the U shape.

8. The pouch according to claim 6, wherein in the bending member, concave-shaped bending auxiliary grooves are formed to assist the bending into the U shape.

9. The pouch according to claim 3, wherein
- the bending member is on an outer surface of the second front sheet or on an outer surface of the second back sheet;
- the buffer support hole penetrates the second back sheet, the second front sheet and the bending member; and
- the bending member overlaps the shelf, the left leg portion and the right leg portion.

10. The pouch according to claim 3, wherein
- the bending member is on an outer surface of the second front sheet or on an outer surface of the second back sheet; and
- the bending member overlaps the shelf, the left leg portion and the right leg portion.

11. The pouch according to claim 3, wherein the first front sheet, the first back sheet, the second back sheet, and the second front sheet each comprise (i) a first film formed of a first material and (ii) a second film of a second material different from the first material.

12. The pouch according to claim 11, wherein the second film is an aluminum film.

13. The pouch according to claim 3, wherein the bending member is formed of a third material different from the first material.

14. The pouch according to claim 3, wherein the third material is different from the second material.

15. The pouch according to claim 3, wherein the bending member has a thickness greater than a thickness of the second back sheet and greater than a thickness of the second front sheet.

16. The pouch according to claim 1, further comprising the one or more buffers, wherein the buffer support hole comprises one or more buffer support holes, and a total number of the one or more buffers matches a total number of the one or more buffer support holes.

* * * * *